United States Patent [19]

Reiner et al.

[11] Patent Number: 4,969,943
[45] Date of Patent: Nov. 13, 1990

[54] METHOD OF MAKING POROUS CERAMIC FLUORIDE

[75] Inventors: Robert H. Reiner, Knoxville; Cressie E. Holcombe, Farragut, both of Tenn.

[73] Assignee: The United States of America as represented by the United States Department of Energy, Washington, D.C.

[21] Appl. No.: 362,991

[22] Filed: Jun. 8, 1989

[51] Int. Cl.$^5$ ............................................. C03C 23/00
[52] U.S. Cl. ........................................ 65/31; 156/663; 65/30.13
[58] Field of Search .............. 65/31, 18.1, 18.4, 30.13; 156/656, 657, 663; 502/10

[56] References Cited

U.S. PATENT DOCUMENTS

| | | | |
|---|---|---|---|
| 2,835,637 | 5/1958 | Dowden et al. | 65/31 |
| 3,881,944 | 5/1975 | Beall et al. | 65/31 |
| 3,979,476 | 9/1976 | Kemp | 585/724 |
| 4,402,924 | 9/1983 | McVicker et al. | 423/258 |
| 4,445,968 | 5/1984 | Hoffman et al. | 65/31 |
| 4,521,236 | 6/1985 | Yamamoto et al. | 65/31 |
| 4,670,614 | 6/1987 | Ushio et al. | 585/417 |
| 4,797,377 | 1/1989 | Laurent et al. | 501/39 |

FOREIGN PATENT DOCUMENTS 62-197314  9/1987  Japan .

OTHER PUBLICATIONS

Carniglia, Thermochemistry of the Aluminas and Aluminum Trihalides, Journal of the American Ceramic Society, vol. 66, No. 7, Jul. 1983, pp. 495–500.
Tkalcec, Formation of Barium Aluminum Fluoride During Removal of Glassy Phase, British Ceramic Trans. Journ., vol. 86, No. 2, 1987, pp. 52–57.

*Primary Examiner*—David L. Lacey
*Assistant Examiner*—John J. Bruckner
*Attorney, Agent, or Firm*—Katherine P. Lovingood; Stephen D. Hamel; William R. Moser

[57] ABSTRACT

A process for making a porous ceramic composite where fumed silica particles are coated with a nitrate, preferably aluminum nitrate. Next the nitrate is converted to an oxide and formed into a desired configuration. This configuration is heated to convert the oxide to an oxide silicate which is then react with HF, resulting in the fluoride ceramic, preferably aluminum fluoride.

2 Claims, No Drawings

METHOD OF MAKING POROUS CERAMIC FLUORIDE

This invention relates to porous ceramics, particularly fluoride ceramics having pore size of about 1 to 2 microns with an open porosity of 56.7%. This invention was developed pursuant to a contract with the United States Department of Energy.

BACKGROUND OF THE INVENTION

Porous ceramics have been developed for use as filters for removal or separation of beer yeast, bacteria, pharmaceuticals and high purity gases. They are important due to their resistance to reactivity and corrosion, and their stability at high temperatures. Most filters in use have pores sizes of over 50 microns although an alumina membrane has been prepared having pore 0.05 microns in diameter and void ratio of up to 40 to 50%.

Of particular interest in this application is the ceramic material $AlF_3$, which can be used in numerous catalytic hydrocarbon conversion processes. $AlF_3$ prepared by most prior art methods and available commercially is a fine powder which cannot be extruded, pelletized or formed into a membrane. It is also characterized by very low surface areas, normally less than 5 $m^2$/gm. An $AlF_3$ extrudate has been prepared having surface areas ranging from 10 to 50 $m^2$/gm, however this process requires the use of hazardous fluorocarbons and does not result in a product as pure as provided by this invention.

Therefore, it is necessary to develop ceramic materials with minimum pore size, maximum specific surface area, and maximum porosity that can operate in corrosive and oxidizing environments and to provide a safe process for making these materials.

SUMMARY OF THE INVENTION

In view of the above needs, it is an object of this invention to provide a ceramic material having a minimum average pore size, a maximum specific surface area and a maximum open porosity.

A further object of this invention is to provide a porous ceramic material for use in oxidizing environments.

Another object of this invention is to provide a porous ceramic $AlF_3$ composite that is virtually 100% pure.

It is also an object of this invention to provide a process for making porous composites of fluoride ceramic material that does not require the use of fluorocarbons which are environmental contaminants.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the composition of matter of this invention may comprise a porous fluoride ceramic solid composite wherein said fluoride is selected from the group comprising yttrium, magnesium, lanthanum, calcium, zirconium, and aluminum having a high porosity, small pore size, and large surface area. Of particular interest is the ceramic $AlF_3$ which has been made virtually 100% pure.

Furthermore, the process of this invention may comprise coating particles of fumed silica with a nitrate compound wherein the cation of the compound is selected from the group comprising yttrium, magnesium, lanthanum, calcium, zirconium, and aluminum; converting the nitrate compound to an oxide compound; pressing the coated silica particles into a desired configuration; heating the configuration in an oxidizing environment to convert the oxide compound to an oxide silicate complex; and exposing the configuration of oxide silicate complex and said coated fumed silica to gaseous anhydrous hydrogen fluoride for removal of the silicate portion of the complex and said coated fumed silica from the configuration conversion to and removal of gaseous silicon fluoride and for conversion of the oxide portion of the complex to a fluoride, leaving a low density and porous ceramic fluoride.

The product ceramic has high surface area, low density, and small pore size and is suitable for use in oxidizing environments.

DETAILED DESCRIPTION OF THE PREFERRED EMBODIMENT

A low density, porous material having a high surface area is needed for use in oxidizing environments at relatively high temperatures. A material of this type would provide an effective surface absorbent and a support medium for catalytic material. Other possible applications include filters for purification of gases, fermentation products, pharmaceuticals and for the removal of organic and inorganic containments from waste solutions. This invention provides such a material.

Fumed silica, a very finely dispersed form of silicon dioxide, is used as a support material for the ceramic product. Upon the removal of the silica, pores are formed within the ceramic membrane. The removal of the silica is effected by the reaction with anhydrous hydrogen fluoride to form gaseous $SiF_4$. The result is a ceramic composite that has a porosity of at least 40%, pore size of not more than 5 microns, and surface area of at least 20 $m^2$/gm. Porosity, pore size and surface area are controlled by the fumed silica, therefore a consistent physical structure will result regardless of the cation of the starting material.

The original objective of the invention was to form porous oxides using the procedure of this invention. The first step was to coat the fumed silica with a nitrate, starting material for the oxide. In this case $Al(NO_3)_3 \cdot H_2O$ was used to coat the silica. The plan was to convert this nitrate to the oxide; however, $Al(NO_3)_3 \cdot H_2O$ converts to the gamma form of $Al_2O_3$, which is reactive with HF. Therefore, first the gamma form must be converted to the alpha form, a form which is not reactive with HF. To do this the configuration was heated to 1000° C., the necessary temperature for the conversion but just below the temperature, 1200° C., for formation of the oxide silicate, $Al_2O_3 \cdot SiO_2$. However, the oxide silicate resulted nevertheless. Applicants theorize that the form of the fumed silica, being so finely dispersed, affected the reaction temperature, resulting in an unexpected oxide silicate product. When this compound is exposed to the HF, the fluoride ceramic is formed.

EXAMPLE

Seventy two grams of fumed silica and 220 grams of aluminum nitrate were slurried in 1500 milliliters of water. This slurry was thoroughly mixed, then the water was evaporated from the slurry at a temperature of 100° C. to provide a dry mixture of silica particles coated with aluminum nitrate. This dry mixture was heated to a temperature of 650° C. for conversion of the aluminum nitrate to alumina, then milled in a mortar and pestle. The milled powder of silica particles coated with alumina was pressed in a die with 10,000 to 20,000 psi into discs having a diameter of 2 inches and a thickness ranging from 0.5 to 1.0 inch. These discs were heated to a temperature of 1150° C. for 15 to 70 hours during which they shrank about 30%. The discs were exposed to 1 atmosphere of hydrogen fluoride at atmosphere of 100° C. for 50 to 100 hours.

Examination of the prepared discs with x-ray diffraction indicated that the discs were composed entirely of aluminum fluoride. In other tests of the discs, the data indicated that the discs had a specific surface area of 38 meters$^2$ per gram, an open porosity of 56.7%. an average pore diameter of 1.9 microns, and over 50% of the pores had a diameter of less than 0.1 micron.

In the subject development, aluminum was used for demonstrating the process. However, it is believed that other materials such as yttrium, magnesium, lanthanum, calcium and zirconium could be substituted for aluminum. Materials of this type could be converted to their respective fluorides and used in an oxidizing environment at relatively high temperatures. The melting points for most of these materials are as follows: yttrium fluoride at 1152° C.; magnesium fluoride at 1263° C.; lanthanum fluoride at 1493° C.; and calcium fluoride at 1418° C. The sublimation points for some of these materials are as follows: aluminum fluoride at 1277° C.; and zirconium fluoride at 627° C. Accordingly, a broad spectrum of stable ceramic materials with high porosity and oxidation resistance could be prepared by the subject process.

We claim:

1. A process for making ceramic solid composites comprising:
    coating particles of fumed silica with a nitrate compound wherein the cation of said compound is selected from the group consisting of yttrium, magnesium, lanthanum, calcium, zirconium, and aluminum;
    converting said nitrate compound to an oxide compound;
    pressing said coated silica particles into a desired configuration;
    heating said configuration in an oxidizing environment to convert said oxide compound to an oxide silicate complex having an oxide component portion and a silica component portion; and
    exposing said configuration of said oxide silicate complex and said fumed silica to gaseous anhydrous hydrogen fluoride so as to cause two reactions;
    a first of said reactions causes said silica portion of said complex and said fumed silica to form gaseous silicon fluoride which is removed from said configuration; and
    a second of said reactions causes said oxide portion of said complex to convert said oxide portion of said complex to a ceramic fluoride, leaving a low density and porous ceramic fluoride.

2. The process of claim 1 wherein said cation is aluminum and said nitrate compound is converted to an oxide compound by heating to a temperature sufficient to decompose said nitrate, said configuration is converted to said oxide silicate complex by heating to about 1100° C., and said product is an AlF$_3$ ceramic.

* * * * *